(12) United States Patent
Vaddadi et al.

(10) Patent No.: US 12,443,465 B2
(45) Date of Patent: Oct. 14, 2025

(54) METHOD AND APPARATUS FOR MANAGING CONCURRENT ACCESS TO A SHARED RESOURCE USING PATCHPOINTING

(71) Applicants: Praveen Vaddadi, Hyderabad (IN); Praneeth Vaddadi, Hyderabad (IN)

(72) Inventors: Praveen Vaddadi, Hyderabad (IN); Praneeth Vaddadi, Hyderabad (IN)

( * ) Notice: Subject to any disclaimer, the term of this patent is extended or adjusted under 35 U.S.C. 154(b) by 432 days.

(21) Appl. No.: 18/122,566

(22) Filed: Mar. 16, 2023

(65) Prior Publication Data
US 2024/0086260 A1    Mar. 14, 2024

(51) Int. Cl.
*G06F 9/52*    (2006.01)
*G06F 9/48*    (2006.01)

(52) U.S. Cl.
CPC .............. *G06F 9/52* (2013.01); *G06F 9/4881* (2013.01)

(58) Field of Classification Search
CPC .................................. G06F 9/52; G06F 9/4881
See application file for complete search history.

(56) References Cited

U.S. PATENT DOCUMENTS

| | | | |
|---|---|---|---|
| 2002/0124161 A1* | 9/2002 | Moyer | G06F 9/328 712/E9.035 |
| 2018/0074865 A1* | 3/2018 | Rungta | G06F 1/24 |
| 2018/0191706 A1* | 7/2018 | Hobson | G06F 21/60 |
| 2021/0132952 A1* | 5/2021 | Feng | G06F 9/544 |
| 2022/0137994 A1* | 5/2022 | Keen | G06F 8/434 717/148 |

* cited by examiner

*Primary Examiner* — Ryan Bertram

(57) ABSTRACT

In one aspect, a computerized method for scalable, correct, and high-performance asynchronous lockless sharing of a computer resource comprising: determining there is a contention for a shared computer resource by a plurality of competing processes, wherein the plurality of competing processes are competing to access a same portion of the shared resource; adding the plurality of competing processes a priority queue; retrieving a process at a front of the queue of the plurality of competing processes; access a work area of the process at a front of the queue; sharing the work area with other processes of the plurality of competing processes in priority queue; sanitizing the work area to obtain a plurality of code bundles; placing the code bundles into a patchpointer; and processing the patchpointer until the patchpointer is empty.

20 Claims, 11 Drawing Sheets

METHOD AND APPARATUS FOR MANAGING CONCURRENT ACCESS TO A SHARED RESOURCE USING PATCHPOINTING

CLAIM OF PRIORITY

"This application claims priority under Article 4A of the Paris Convention for the Protection of Industrial Property to Indian Patent Application No. 202241063919, filed on Nov. 9, 2022 and titled METHOD AND APPARATUS FOR MANAGING CONCURRENT ACCESS TO A SHARED RESOURCE USING PATCHPOINTING."

BACKGROUND

In a shared multiprocessor/multi-core processor setting, there is a need for optimizing transaction processing on shared resources. Contention on shared resources in concurrent environments is the primary inhibitor of scalability, performance and predictability (in terms of throughput and latency) of a concurrent/parallel application.

Many technologies have been proposed to enhance the performance of transaction processing in concurrent settings. On the hardware front, multiple microprocessors provide large workload capacity, while also providing multithreading functionality to act on shared computer resources. Various multiprocessors exist that provide cache coherency guarantees at the cache line level among processor cores. On the software front, multithreaded operating systems with logically partitioned address space have been developed. These permit computer programs to parallelly run-in multiple threads to enable concurrent tasks.

While parallelism enhances system performance and transaction processing in shared resources, it adds an additional complexity of task synchronization. Concurrent processes are generally unaware of activities and state of other processes and thus may interfere with their operations. This may result in data corruption, system crashes and other such indeterminate outputs. One example of a shared resource is buffer queue in a network adapter in a computer: processes compete for slots that reside in the buffer. The slots hold frames of data (network data packets). Concurrent access of processes to the slots to transact on frame data (in the slots) is typically managed through locking, interrupts or in a lockless fashion.

Another example of a shared resource is the computer heap memory: processes compete with each other for heap memory. The memory allocator (provided by the operating system or custom designed allocators) needs to manage concurrency either by locking or lockless mechanisms.

Locking (or interrupts) is a way to introduce serializability among multiple concurrent processes. It is a way to restrict access to the shared resource to other processes by a lock holding (or interrupting) process. Such locking and interrupt mechanisms prove counterproductive from concurrency/parallelism standpoint. To alleviate the drawbacks of locking and interrupt mechanisms, lockless methods have been developed. One major advantage of lockless algorithms over locking algorithms is that lockless offers protection against unbounded lock time. In lockless mechanisms, synchronization among processes is achieved by atomic transitions between consistent states of the shared resource.

A lockless algorithm is generally optimized for a specific data structure like FIFO queues, Ring Buffers, Sets, etc.). Such mechanisms work fine as long as the complete transaction processing engine centers around that single data structure. But even then, their correctness is very difficult to verify and are not easily extensible/applicable to other data structures. Various lockless algorithms supporting multiple updating/writing processes suggested in the prior art are very complicated in design, generally viewed impractical (and rarely implemented in practice), and scale very badly. These and other key limitations are generally well recognized in the art.

Various data structures have been implemented offering different progress guarantees for different operations (e.g., lock-free circular buffers for multiple producers and consumers, lock-free queues and stacks, etc.).

When various heterogeneous system components/datasources (I/O Buffers, Memory Heaps, External Database Arrays, Collection of Objects, etc.) need to interact with one another, the state of art lockless methods negatively impact the performance due to bad interoperability of lockless algorithms, large context switching overheads, need numerous atomic operations to execute, need numerous cache line transfers, high cost of exchanging state between CPU cores, and excessive data copying (resulting in huge latencies and high consumption of computer resources and energy).

In locking algorithms, it is generally sufficient to handle the locking dependencies and critical sections of processes alone. For lockless algorithms, due to absence of critical sections, the number of execution traces of the concurrent application, involving the interactions of shared variables can be very large. This problem is generally referred to as state space explosion.

Also, in a distributed setting, where many multi-processor computers are connected by networks (LAN, WAN, or Internet), this problem of optimizing for shared source transaction processing is amplified due to network overhead (TCP/IP) and performance degrades rapidly.

As such, in a multiprocessor/multithreaded (and/or distributed) setting, due to the overhead and bad-interoperability among intermix of locking, interrupt and/or lockless mechanisms in managing concurrent access to heterogeneous shared data sources (like arrays, linked lists, sets, ring buffers, B-Trees, etc.), many state of art database systems suffer from data losses, stale reads, read skews, lock conflicts, etc., compromising on both transactional guarantees and performance.

A substantial need exists for an improved coordination among concurrent processes/tasks/threads that is applicable to any type of shared data source (in a multithreaded computer and/or network of multithreaded computers) and offers high performance gains and transactional guarantees. Also, no solution (either lockless or locking) exists that allows concurrent writes to a shared data source without needing high amounts of data copying (or caching) presently. The present invention achieves this goal.

SUMMARY OF THE INVENTION

In one aspect, a computerized method for scalable, correct, and high-performance asynchronous lockless sharing of a computer resource comprising: determining there is a contention for a shared computer resource by a plurality of competing processes, wherein the plurality of competing processes are competing to access a same portion of the shared resource; adding the plurality of competing processes to a priority queue; retrieving a process at a front of the queue of the plurality of competing processes; access a work area of the process at a front of the queue; sharing the work area with other processes of the plurality of competing processes in priority queue; sanitizing the work area to obtain a plurality of code bundles; placing the code bundles into a patchpointer; and processing the patchpointer until the patchpointer is empty.

BRIEF DESCRIPTION OF THE DRAWINGS

The present application can be best understood by reference to the following description taken in conjunction with the accompanying figures, in which like parts may be referred to by like numerals.

Figure 1:
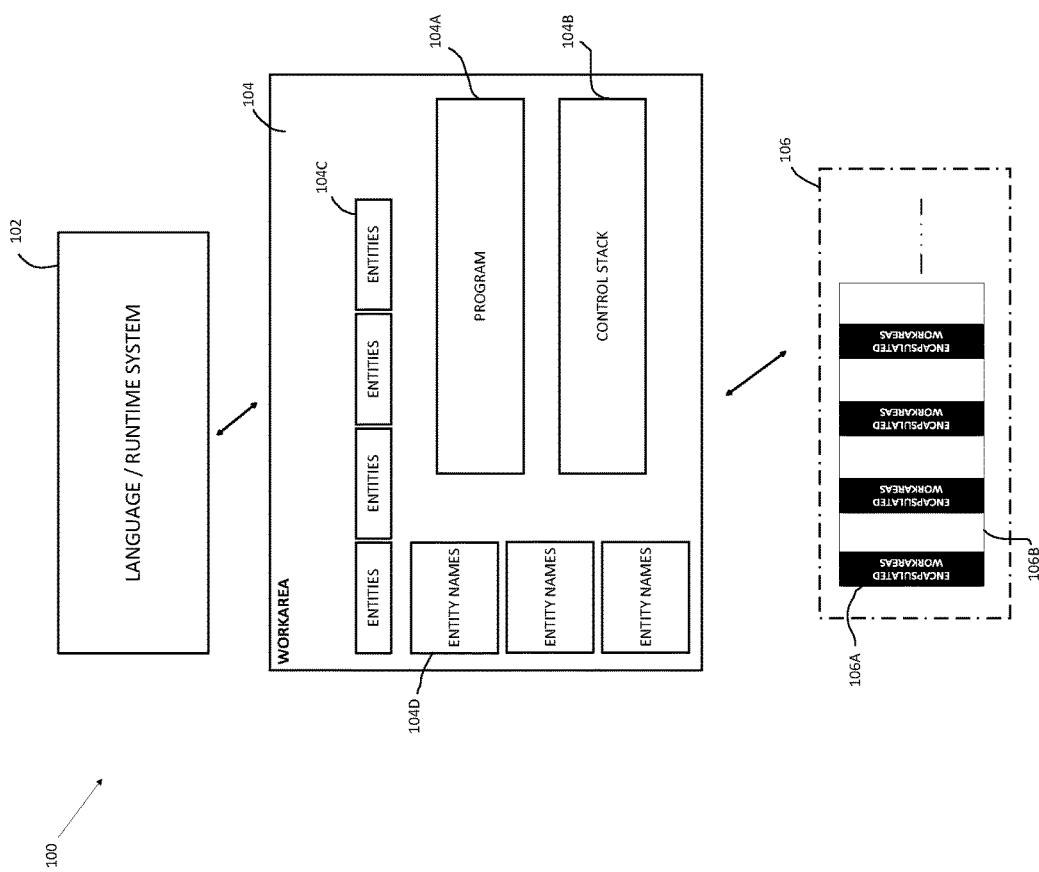
FIG. 1 illustrates a simplified view of a work area of a process and its interaction with other encapsulated work areas.

The Figures described above are a representative set and are not an exhaustive with respect to embodying the invention.

DESCRIPTION

Disclosed are a system, method, and article of manufacture for managing concurrent access to a shared resource using patchpointing. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

The following terminology is used in example embodiments:

ABA problem is a multithreading problem that occurs during synchronization, when a location is read twice, has the same value for both reads, and "value is the same" is used to indicate "nothing has changed". However, another thread can execute between the two reads and change the value, do other work, then change the value back, thus fooling the first thread into thinking "nothing has changed" even though the second thread did work that violates that assumption.

Arrays, B-Trees, linked-lists, queues, stacks, etc. are some examples of data structures.

Compare-And-Swap (CAS) is an atomic operation that takes three arguments (R, expected_value, new_value), where R is the register on which it is applied, expected_value is the expected value of the register, and new_value is the new value to be written. The operation compares expected_value with the current value of R, and atomically updates R to new_value if the expected value matches the current value. In this case, we say that the CAS succeeds. Otherwise, the value of R is not updated, and the CAS fails.

Contention is a product of the effective arrival rates of requests to a shared resource that directly (adversely) affects the responsiveness of a system.

Data structure is implemented using code for processes to run for each of its operations.

Generative model is a statistical model of the joint probability distribution P(X,Y) on given observable variable X and target variable Y.

Machine learning can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Patchpointing is a method to manage concurrent accesses to a shared computer resource. A patchpointer is a data structure used for patchpointing operations.

Program/task/thread/process running a lockless algorithm does not use locks (e.g. mutexes, semaphores, etc.).

Steps taken by a process implementing an execution sequence are called operations.

Set of operations is called a data structure. Each operation has an expected behavior that is defined using a sequential specification. That is, it specifies the behavior of an operation in an environment where no other process/thread/task is interleaved with the steps of the executing process.

Transaction refers to one or more execution sequences (e.g. machine executable instructions).

These definitions are provided by way of example and not of limitation. They can be integrated into various example embodiments discussed infra.

Example Systems and Methods

In accordance with the invention, work areas of processes can be encapsulated and permitted to reside in data storage (in host processor or remote location). Encapsulated work areas can be accessed by plurality of live work areas, whether directly or through other encapsulated work areas. FIG. 1 shows a simplified view of an exemplary work area of a process, along with its data structures and interactions among them. A process has its language/runtime system 102 associated with it, which couples with its live work area 104. The live work area 104 can access named entities from other encapsulated work areas 106 that are addressable by name 106A. 106B is denotive of the contents inside an encapsulated work area, which may contain other encapsulated work areas. Encapsulated work areas may also hold a language/runtime processor 102 inside them. The control stack 104B maintains the execution/call stack of the program source code 104A. The program 104A may also be optionally stored in binary format (e.g., as object module).

Figure 2A:
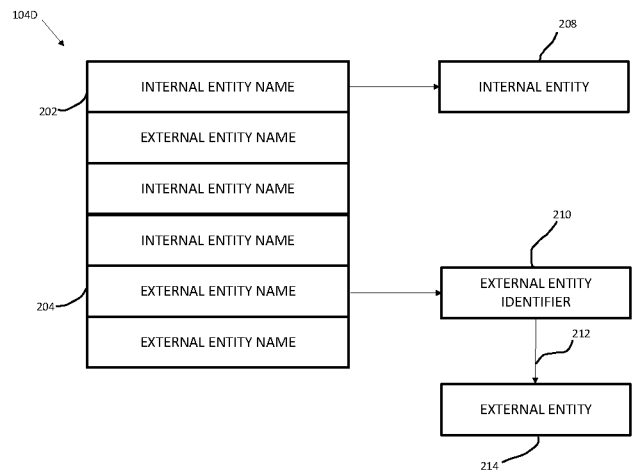
FIG. 2A illustrates a simplified view of logical connection between a live work area and an encapsulated work area.
Figure 2B:
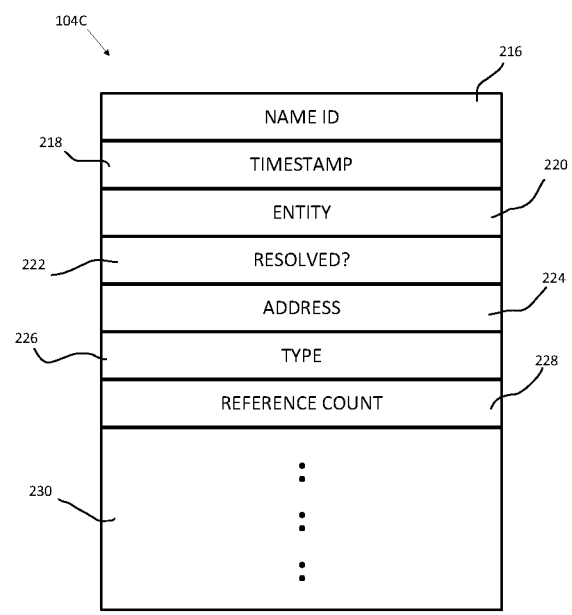
FIG. 2B illustrates a simplified view of the symbol or name table inside a work area.

Each work area has a symbol or name table, as is shown diagrammatically 104C in FIG. 2B. An exemplary name table may a plurality of address pointers as entries pointing to named entities within a work area. Such internally pointed entities are called internal entities. Entities residing outside live work area are called external entities.

The name or symbol table is populated with various entries for named entities with fields such as name identifier 216, creation date or timestamp 218, entity value (if applicable) 220, a bit (or flag value) to check whether entity name is resolved or not 222, address of the entity 224, the class type of the entity 226 (function, variable, constant, etc.), a reference count 228 for garbage collection purposes, and other miscellaneous fields (for example, if the entity is of array type, then addition fields like rank, shape, total number of elements, flag to check if it is sorted, etc.) may be present. Such entries for each named entity populate the name or symbol table 230.

Private copies of named entities from each accessed work area can be modified and retained in the live work area. A database of encapsulated work areas may be loaded preparatory to process execution or may be loaded upon a determined need. Subject to operating system's allocation controls, once an encapsulated work area is loaded, it is internalized into the live work area.

Figure 3:
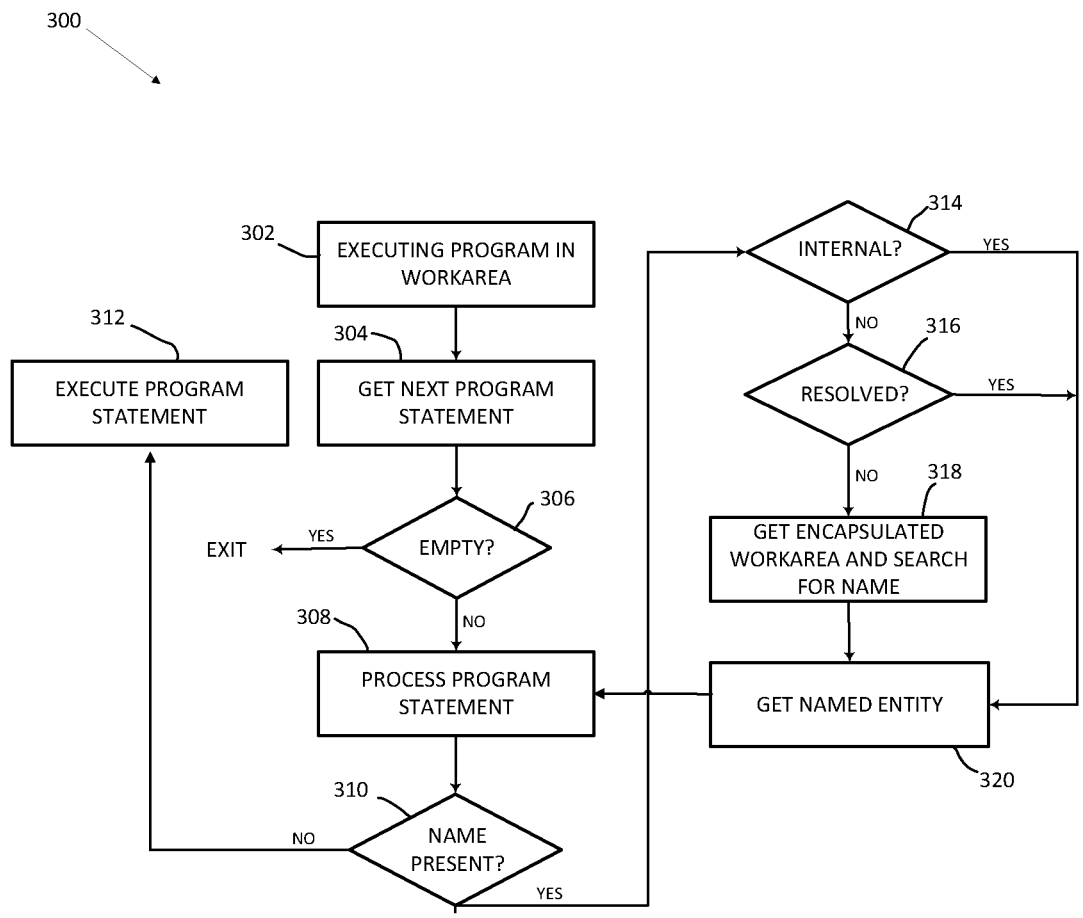
FIG. 3 illustrates a simplified flow chart of machine operations relating to FIGS. 1, 2A and 2B.

While executing a program, the language/runtime system stores in the corresponding work area a copy of all modified entities and changes in the symbol or name table, like marking external named entities as "resolved" or "not resolved", etc. FIG. 3 illustrates a simplified flowchart of such name resolution and modification of work area by language/runtime system. Upon starting, the work area is initialized 302 and the next program statement is executed 304. If there is no statement to execute 306, the name resolution procedure halts. Else, if the program statement contains a name 308 and 310 and is internal 314, it accesses the entity. If it is external, it resolves by accessing encapsulated work area 318 and searches for the name and then accesses the entity 320. If the program statement does not contain any reference to a name 312, it is executed normally. This procedure continues until all names are resolved and the live work area is populated with entities.

Figure 4:
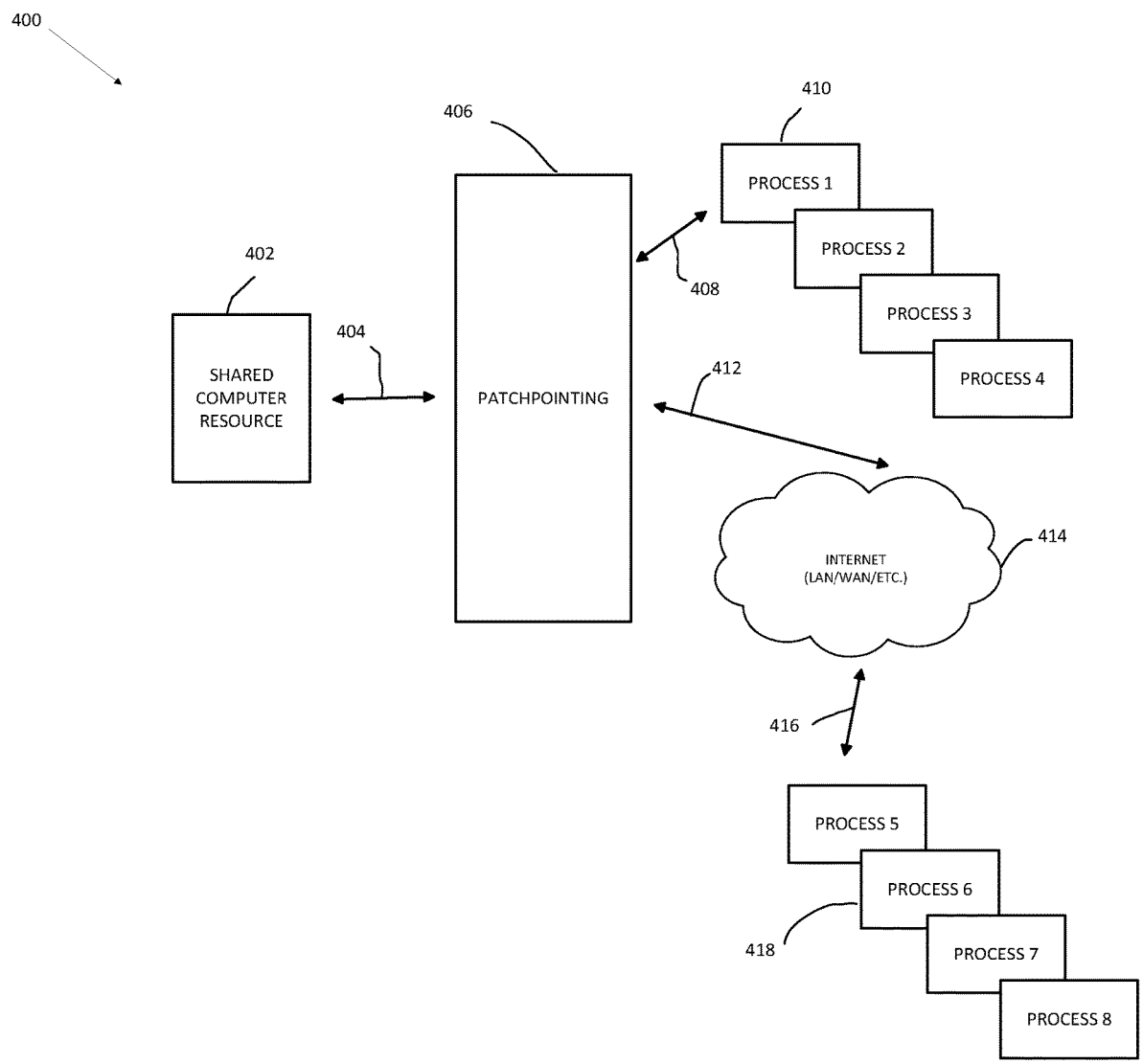
FIG. 4 is a block diagram illustrating the context of operation of the present invention.

FIG. 4 shows a block diagram of the problem context relating to present invention. Scalable, correct, and high-performance asynchronous lockless sharing of a computer resource 402 among a set of processes is a fundamental problem in distributed computing. It becomes all the more difficult where processes 410 and 418 move at arbitrary speeds and are crash prone. Network communication 414 may also contribute to increased latencies and distributiveness. Patchpointing 406 is a proposed lockless concurrent shared resource management mechanism that achieves high scalability, handles dynamic loads, offers great performance guarantees and is simple to implement and doesn't require complicated correctness proofs for its operations.

Access to the shared computer resource 402 is managed by 406. The shared resource can be distributed across various systems (external data storage, nodes, computers, across internet, etc.) and 404 denotes the communication between 402 and 406. Various processes 410 and 418 may interact asynchronously with 406 directly or via internet, through an API interface 408 and 412.

Figure 5:
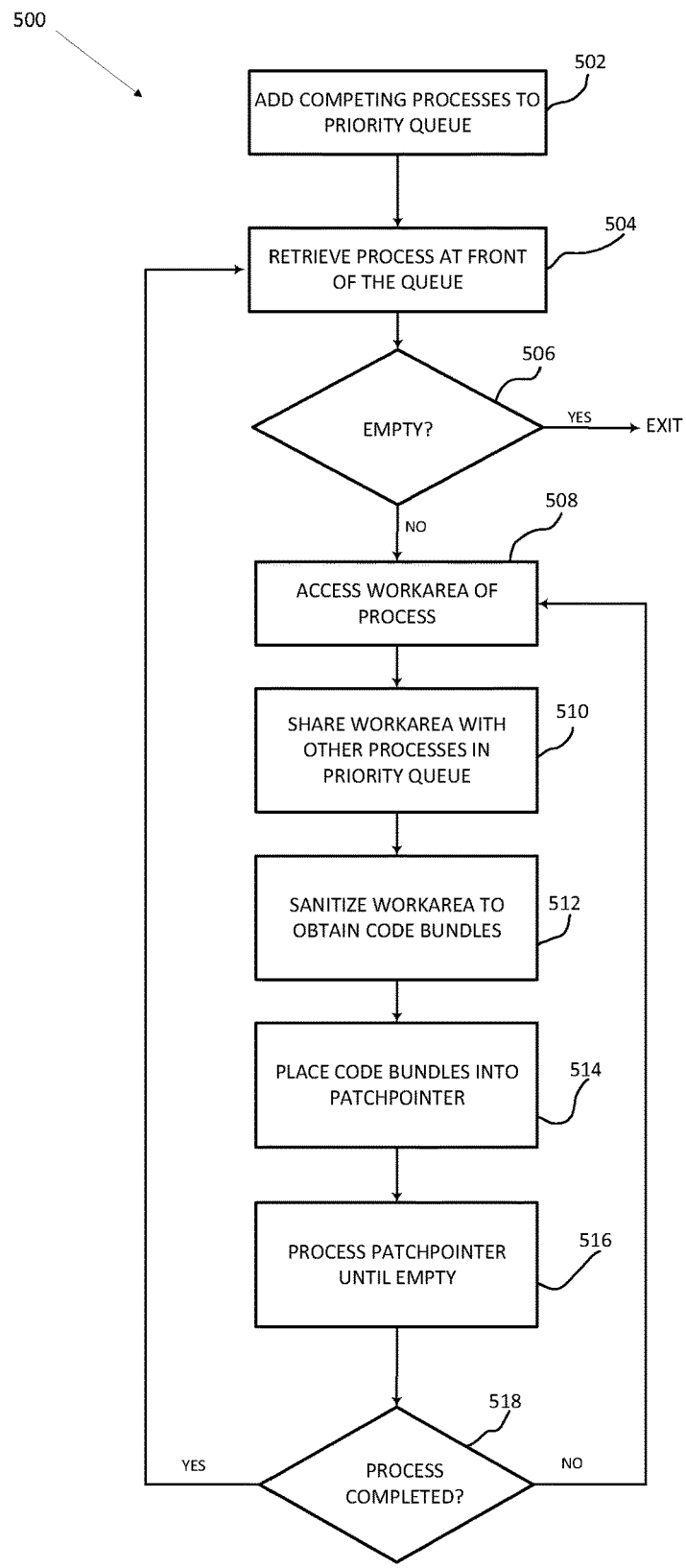
FIG. 5 illustrates a flowchart of overall operation of patchpointing.

FIG. 5 presents a flow-chart diagram of the overall operation of 406. In light of contention, where many processes compete to access the same portion of shared resource, all competing processes are added to a priority queue 502. Other data structures adaptive radix trees, chaining hash maps, balanced or unbalanced binary search trees (BST), linked lists, etc., may also be used in place of priority queues.

The priority order may be made suitable according to various preferences. For example, the contending processes can be prioritized based on their timestamp (access request priority, order of arrival, etc.), compute resources (processes with larger compute resources like GPU/CPU/TPU and larger memory may take higher priority compared to others with lower compute resources, or vice-versa, etc.), latency times (processes with high network latencies may be prioritized first, or vice-versa, etc.). The priority order may also be made dynamic and programmed into the ordering schedule. The chosen data structure (priority queue, linked list, balanced, or unbalanced BST, adaptive radix tree) is populated accordingly. In step 504, process 500 retrieves a process at front of the queue.

Figure 6:
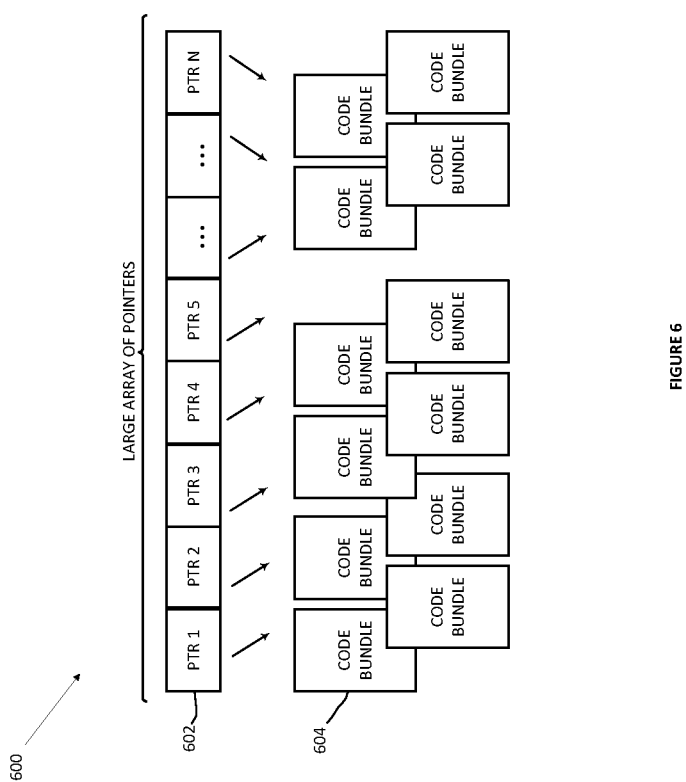
FIGS. 6 and 7 illustrate a simplified view of one exemplary implementation of patchpointer data structure along with its operations in present invention.
Figure 7:
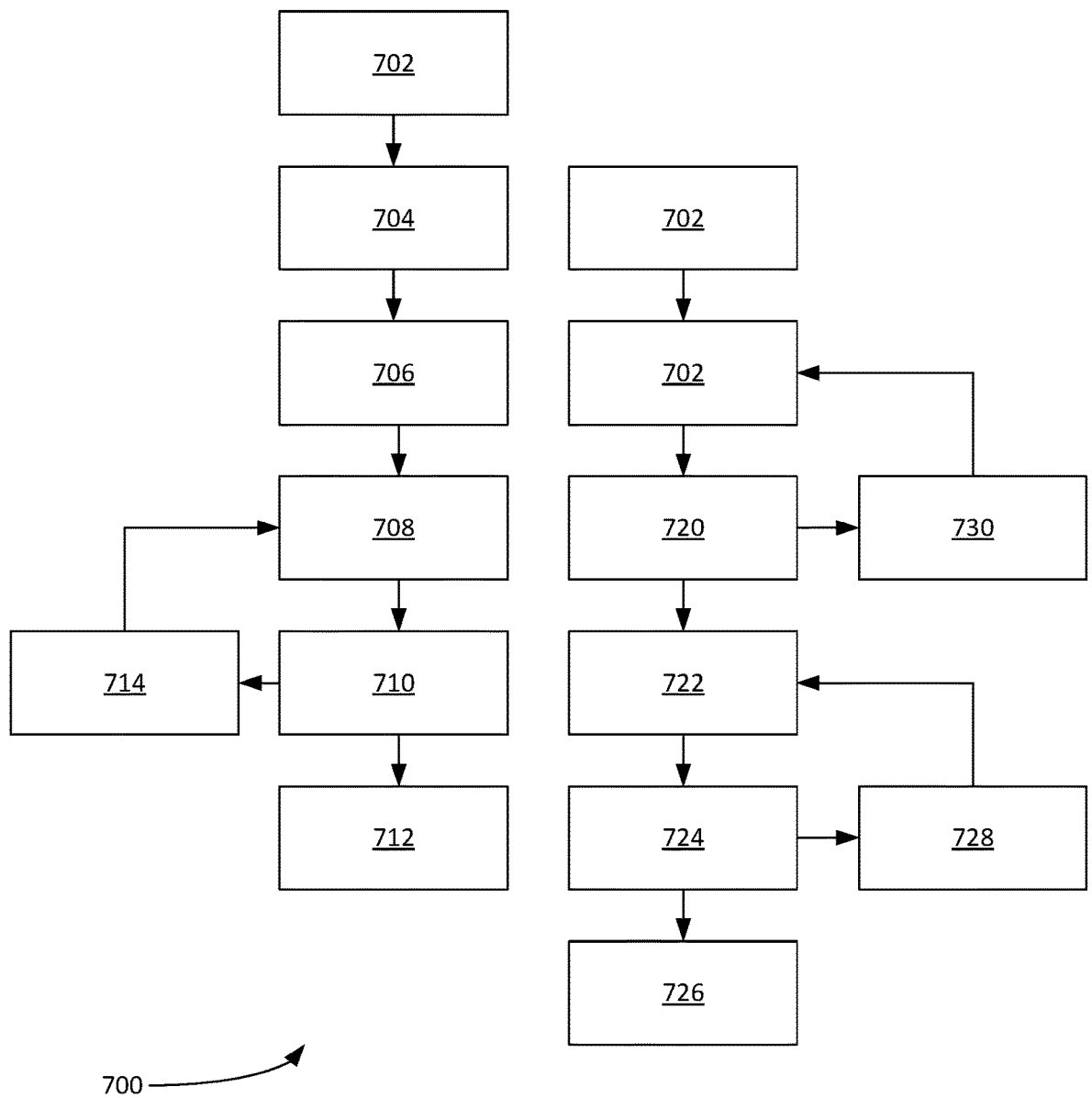

The mechanism of patchpointing 406 is based on a data structure called patchpointer. The structure and operations on patchpointer are illustrated in FIGS. 6 and 7 respectively. The underlying intuition is that, to reduce contention drastically, competing processes must be turned into collaborating processes, and collaborating processes should simultaneously pick processing work uniformly at random, and attempt to insert processing work simultaneously at uniformly available random locations in the patchpointer. The processing work referred here pertains to execution of code bundles. The aforementioned priority queue can be updated continuously, and new processes can be added at any time.

In the patchpointing mechanism, for each cycle of operation, the following steps are performed, until the priority queue is empty (e.g. as determined in step 506). The process P with highest priority is retrieved and its work area is accessed 508. If its work area is not yet initialized, it is initialized by its corresponding interpretive processor. The work area is made shareable 510 among all the processes in the priority queue. This sharing of work area can utilize various techniques such as POSIX shmem API, XPMEM, SMARTMAP, PVAS, MPI interfacing, etc. The work area, and specifically the program code inside the work area is analyzed 512 and various code bundles are extracted from it. A block of code without any function arguments is called a code bundle, and code bundles may be nested inside one another. Any function (or subroutine or procedure) can be transformed into a code bundle (or a collection of code bundles) by wrapping it in code that reads arguments from memory. For example, a lambda expression (or a procedure or subroutine with no arguments) in Java or C++ or Lisp or APL or Fortran is a code bundle.

The code bundles can also be split (or merged) according to preferences. For example, the code bundles can be split according to call-by-value (CBV) or call-by-name (CBN) continuation-passing style (CPS). Various programs exist which translate a given source code to CBV CPS or CBN CPS. Code bundles can also be merged together to better suit tensor computations (SIMD, SIMT, etc.). Code bundles can also be nested inside one another. Code bundles may or may not be disjoint from one another. However, highest performance and scalability is achieved with disjoint and short code bundles.

This analysis of program code and extraction of code bundles may be a multithreaded (parallel) computation. Code bundles may be further split or merged according to access patterns on the underlying shared computer resource. Extracted code bundles can be simultaneously placed into the patchpointer and read simultaneously by collaborating processes 514. Step 514 can be a multithreaded operation.

The code bundles may reside inside the work area of process P. The collaborating processes may have access to their private memory. The patchpointer data structure contains a fairly large array 602 of pointers, preferably of size $2^k$ (i.e., an integer power of 2) pointers. The array values may be optionally initialized to NULL.

Step 516 processes the patchpointer until all code bundles of process P have been executed and there is no contention from process P for the shared resource 518. Once process P is popped out and completed, the next process in the priority order is processed in the same way.

The patchpointer can be simultaneously accessed by many processes or threads. Process P (which can be multithreaded) or any other helper processes (which can be multithreaded) can add pointers to code bundles 604 by first acquiring a random per-thread index into the patchpointer.

A pointer to a code bundle is added by CAS into the index, assuming the value at index is NULL. If CAS is successful, index is incremented by 1, and another entry is added. If CAS fails, index is incremented by 1 and is tried again. If index value equals maximum index value of the patchpointer, then index is set to 0 (or any other chosen or random value less than maximum index value).

Each process in the priority queue (including process P) acquires a random per-thread index into the patchpointer. A code bundle is accessed by first reading a pointer from the index. If the pointer value at index is NULL, then the index value is incremented by one, and is tried again. If the pointer value is not NULL, then a CAS is made that sets it to NULL. CAS returns the pointer to the code bundle which is to be processed. If CAS is successful, then index is incremented by one, and another entry is retrieved. If CAS fails, then index is incremented by one, and tried again. If index value equals maximum index value of the patchpointer, then index is set to zero (or any other chosen or random value less than maximum index value). The accessed code bundle is optionally copied into the private memory of the process for further processing.

All processes start executing the code bundles simultaneously. A process (or thread) may choose to split its code bundle into multiple code bundles and add to the patchpointer. When a process splits a code bundle into multiple code bundles and adds them to the patchpointer, it modifies the work area of P accordingly so as to keep the pointer entries in the patchpointer valid and maintain linearizability and idempotence. Each process (or thread), when it starts executing a code bundle, may maintain a history of its operation (like line numbers, or stack position, etc.) in its private memory so that it can go back to previous code bundle when it has finished executing another code bundle. This is immensely useful for executing nested code bundles. Whenever it encounters a load or store or allocate or free instruction in a code bundle, it uses the shared work area of process P. It uses LL/SC (OR LLX/SCX) for load and store operations (i.e., load and store the named entities) and updates the work area accordingly. If LL/SC (OR LLX/SCX) fail, they are tried again. Memory management instruction free is deferred until all code bundles are finished executing or until it is safe to do so (i.e., no pending process needs access to freed named entity). Memory instruction allocate may be executed immediately using CAS. A process can check the shared work area if the allocation of the named entity already took place and use it instead. This helps in avoiding over-allocating and double-freeing problems.

After processing various tasks and the code bundles, various garbage collection techniques can be used to free the system memory when it is safe to do so (to avoid memory leaks, etc.).

FIG. 7 illustrates a flow-chart for simultaneous read and write operations on the patchpointer. A fairly large array of pointers 702 is allocated initially. A size of 2k, where k is fairly large is preferred. When a process (or thread) comes, a check is made to see whether it is a read operation or a write operation 704. If it is a write operation, a per-thread index is allotted randomly to the writer 706 and CAS operation is tried 708, and if it succeeds 710, that inserts the pointer to the code bundle at that index, and index is incremented by one 712. If CAS operation fails, index is incremented by one 714 and write operation is retried. If it is a read operation, a per-thread index is allotted randomly to the reader 716, and the patchpointer value is read from that index 718. If the value is not NULL 720 (i.e., a value pointer value exists), a CAS operation is tried 722, and if succeeds 724, that sets the value to NULL and accesses the code bundle at the pointer value, and index is incremented by one 726. The code bundle may be optionally copied to the private memory of the reader process. If CAS operation fails, the index is incremented by one 728 and the operation is retried. If patchpointer value read from index is NULL 720, then index is incremented by one 730 and the operation is retried. At any instance, if index value equals maximum index value of the patchpointer, then index is set to 0 (or any other chosen or random value less than maximum index value).

In some examples process 700 (and/or other process used herein) can use the atomic synchronization primitives LL/SC (or LLX/SXX) (Load-Linked/Store-Conditional) for supporting hardware (e.g., MIPS architecture, etc.); or CAS (Compare-And-Swap) for supporting hardware (e.g., x86, etc.). Techniques like multiword-Compare-And-Swap (like DCAS), etc., can also be used on to simulate LL/SC (or LLX/SCX) operations on hardware lacking LL/SC (or LLX/SCX) support. Almost all computing hardware available today support these primitives.

Figure 8:
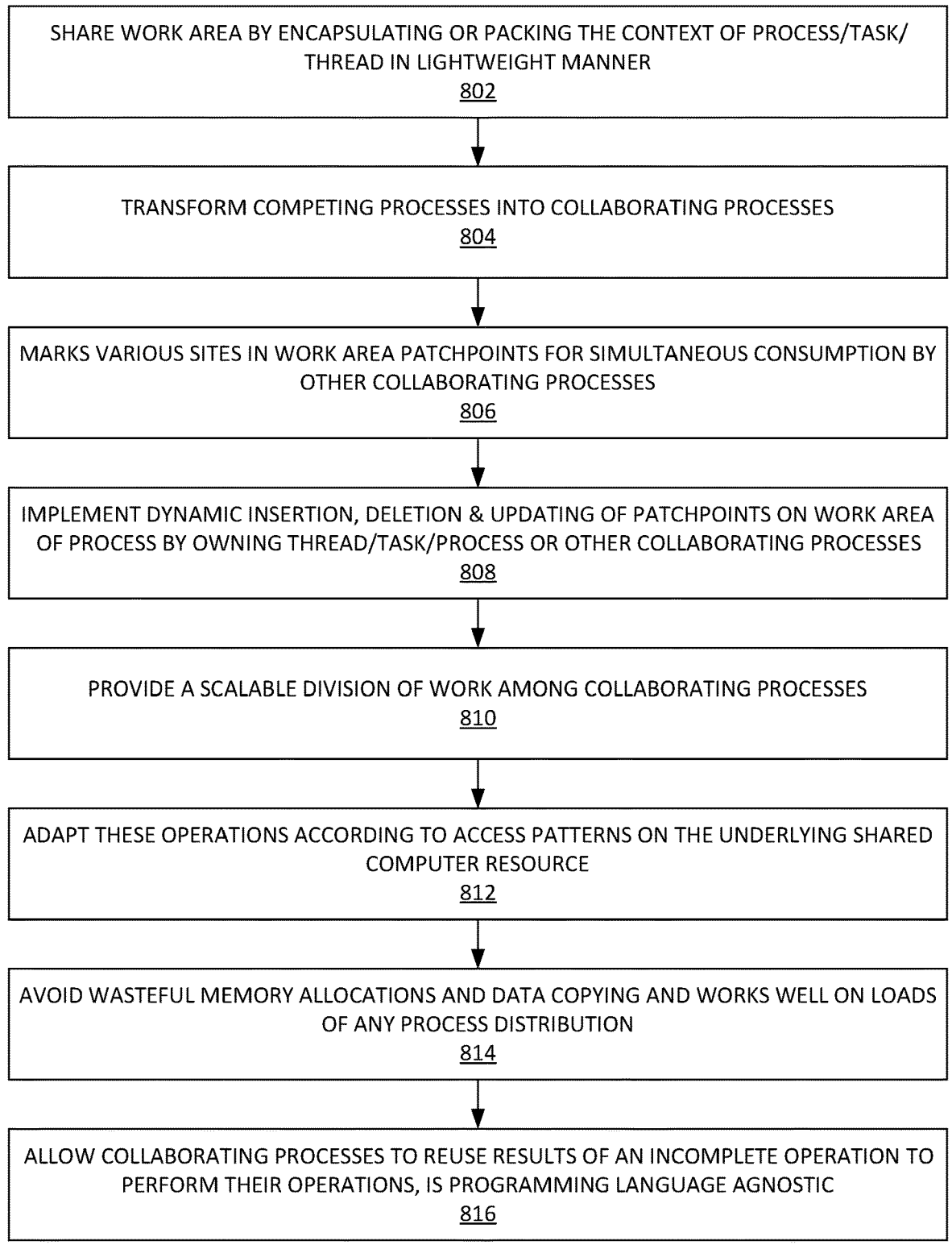
FIG. 8 illustrates an example process for patchpointing, according to some embodiments.

FIG. 8 illustrates an example process 800 for patchpointing, according to some embodiments. Patchpointing is an inventive technique that implements the following steps. In step 802, process 800 shares the work area by encapsulating or packing the "context" of a process/task/thread in a "lightweight" manner. Lightweight sharing can be a sharing the work area of a program (or a process/thread) with other programs (e.g. processes or threads) without extraneous memory copying and lock management. The context can be the work area of a program (e.g. or a process/thread) containing data and code objects. In step 804, process 800 transforms competing processes into collaborating processes. In step 806, process marks various sites in the work area with patchpoints for simultaneous consumption by other collaborating processes. Patchpointing is a method to manage concurrent accesses to a shared computer resource. A patchpointer is the data structure used for patchpointing. Additional information regarding patchpointer data structures and patchpointing are provide herein.

In step 808, process 800 allows/implements dynamic insertion, deletion and updating of patchpoints on the work area of a process by the owning thread/task/process or other collaborating processes. In step 810, process 800 provides a scalable division of work among collaborating processes. In step 812, process adapts its operations according to access patterns on the underlying shared computer resource.

In step 814, process 800 avoids wasteful memory allocations and data copying and works well on loads of any process distribution (e.g. both uniform and non-uniform contention). In step 816, process 800 allows collaborating processes to reuse results of an incomplete operation (e.g. due to abort or crash of another process) to perform their operations, is programming language agnostic.

Figure 9A:
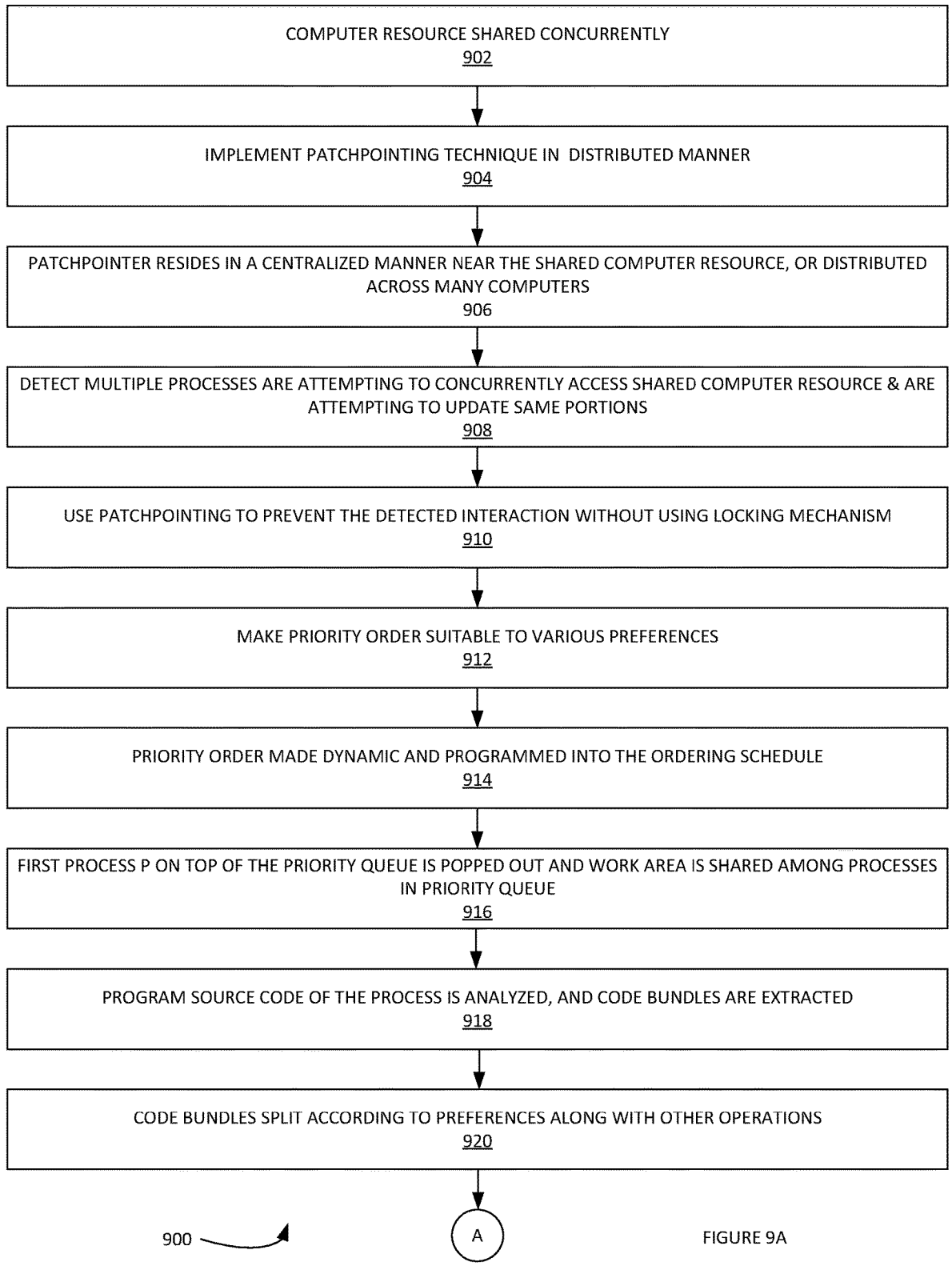
FIGS. 9A-B illustrates an example process for sharing a computer resource accessed by various processes, according to some embodiments.
Figure 9B:
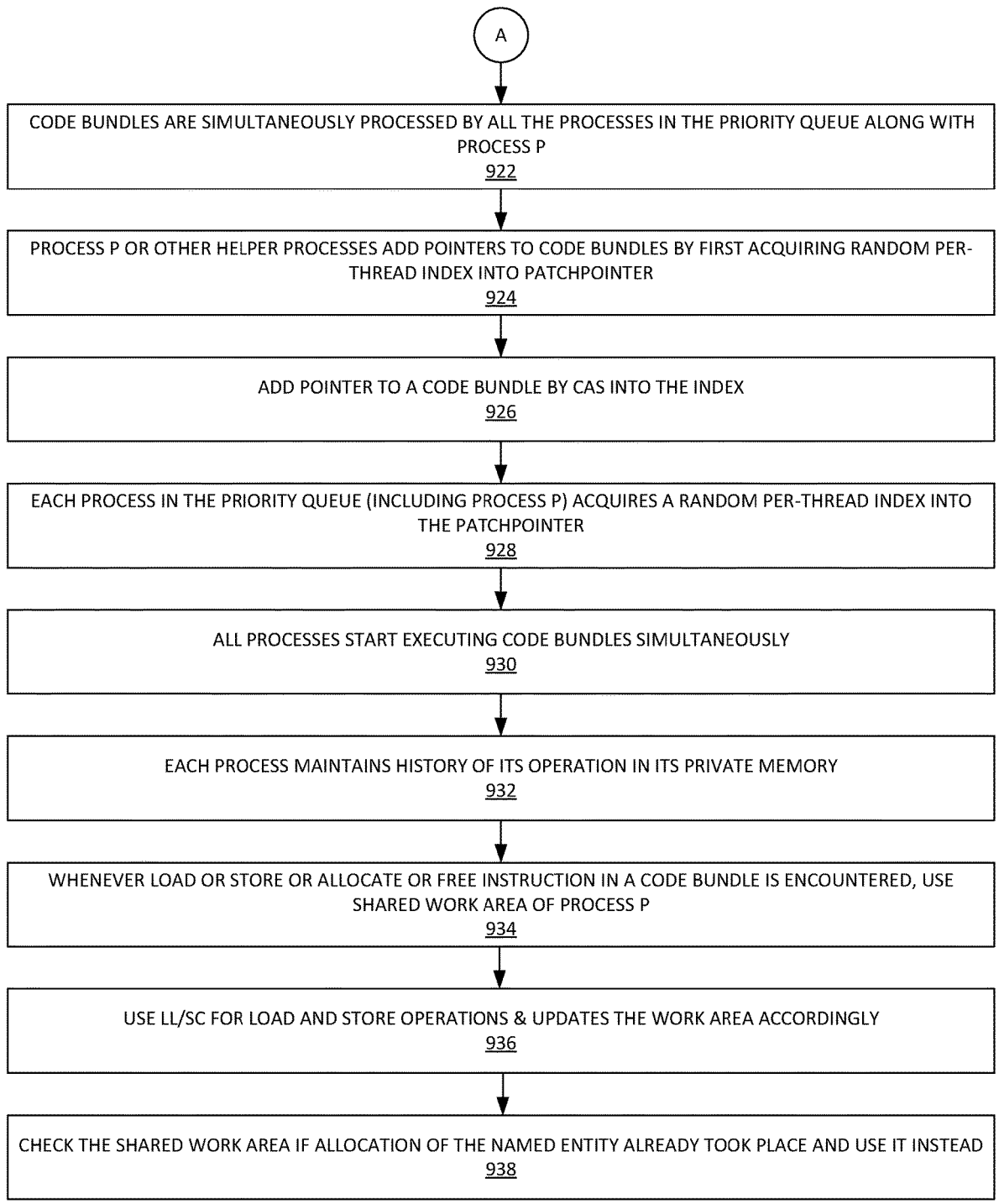

FIGS. 9A-B illustrates an example process 900 for sharing a computer resource accessed by various processes, according to some embodiments. In step 902, the computer resource can be shared concurrently (e.g. or asynchronously). The shared resource can be local to the computer (e.g. centralized) or distributed across various multiprocessors. The shared resource can also be logically partitioned into disjoint blocks, according to the access patterns of underlying data structures.

In step 904, process 900 implementing the patchpointing technique in a distributed manner. In step 906, the patchpointer resides in a centralized manner near the shared computer resource, or distributed across many computers (e.g. or nodes, or over the network, etc.). Each process has also access to its private memory.

In step 908, process 900 detects that multiple processes are attempting to concurrently access the shared computer resource and are attempting to update the same portions of the shared computer resource at the same time. In step 910, process 900 uses patchpointing to prevent the detected interaction without using locking mechanism. In this way, process 900 reduces the contention drastically.

Patchpointing is based on the key principle that simultaneous access to same portions of shared data resource can be made possible by transforming competing processes into collaborating processes. In process 900, all processes competing to access same portions of the shared resource are added to a priority queue.

In step 912, the priority order may be made suitable to various preferences. For example, the contending processes can be prioritized based on their timestamp (access request priority, order of arrival, etc.), compute resources (processes with larger compute resources like GPU/CPU/TPU and larger memory may take higher priority compared to others with lower compute resources, or vice-versa, etc.), latency times (processes with high network latencies may be prioritized first, or vice-versa, etc.). In step 914, the priority order may also be made dynamic and programmed into the ordering schedule.

In step 916, the first process P on top of the priority queue is popped out and its work area is shared among all the processes in the priority queue. Numerous techniques exist to share the work area among all the processes like address space sharing, message passing, etc., These can use, inter alia: POSIX shmem API, XPMEM API, SMARTMAP, PVAS, MPI interfacing, etc.

In step 918, the program source code of the process is analyzed, and all the code bundles are extracted. A code bundle can be a block of code without any function arguments in it. Since function arguments can always be resolved by their memory addresses, any code can be converted to a code bundle (e.g. or a collection of code bundles). For example, a lambda expression (e.g. or a procedure or subroutine with no arguments) in Java or C++ or Lisp or R or Fortran is a code bundle.

In step 920, the code bundles can also be split (e.g. or merged) according to preferences along with other operations. For example, the code bundles can be split according to call-by-value (CBV) or call-by-name (CBN) continuation-passing style (CPS). Various programs exist which translate a given source code to CBV CPS or CBN CPS. Code bundles can also be merged together to better suit tensor computations (SIMD, SIMT, etc.). Code bundles can also be nested inside one another. Code bundles may or may not be disjoint from one another. However, highest performance and scalability is achieved with disjoint code bundles.

In step 922, these code bundles are simultaneously processed by all the processes in the priority queue along with process P. As each code bundle is executed, the work area of process P gets updated. Execution of process P completes when all of its code bundles are finished executing. We use patchpointer data structure to facilitate the simultaneous processing of code bundles for high scalability. Pointers to code bundles are added to the patchpointer and the code bundles are accessed and processed by multiple processes. Both the addition into and processing of code bundles in patchpointer can be multithreaded (e.g. and simultaneous). The code bundles may reside inside the work area of process P.

Patchpointer data structure can contain a fairly large array of pointers (e.g. 2000, etc.). The array values may be optionally initialized to NULL. It can be concurrently accessed by many processes or threads.

Process P (e.g. which can be multithreaded) or any other helper processes (e.g. which can be multithreaded) can add pointers to code bundles by first acquiring a random per-thread index into the patchpointer in step 924. In step 926, a pointer to a code bundle is added by CAS into the index, assuming the value at index is NULL. If CAS is successful, index is incremented by 1, and another entry is added. If CAS fails, index is incremented by 1 and is tried again. If index value equals maximum index value of the patchpointer, then index is set to 0 (or a random value less than maximum index value).

In step 928, each process in the priority queue (including process P) acquires a random per-thread index into the patchpointer. A code bundle is accessed by first reading a pointer from the index. If the pointer value at index is NULL, then the index value is incremented by 1, and is tried again. If the pointer value is not NULL, then a CAS is made that sets it to NULL. CAS returns the pointer to the code bundle which is to be processed. If CAS is successful, then index is incremented by one, and another entry is retrieved. If CAS fails, then index is incremented by one, and tried again. If index value equals maximum index value of the patchpointer, then index is set to zero (or any other chosen or random value less than maximum index value).

In step 930, all processes start executing the code bundles simultaneously. A process (or thread) may choose to split its code bundle into multiple code bundles and add to patchpointer. Each process (or thread), when it starts executing a code bundle, may maintain a history of its operation (like line numbers, or stack position, etc.) in its private memory so that it can go back to previous code bundle when it has finished executing another code bundle in step 932. This is immensely useful for executing nested code bundles. Whenever it encounters a load or store or allocate or free instruction in a code bundle, process 900 uses the shared work area of process P of step 934.

Process 900 can use LL/SC (OR LLX/SCX) for load and store operations (e.g. load and store the named entities) and updates the work area accordingly in 936. If LL/SC (OR LLX/SCX) fails, they are tried again. Memory management instruction free is deferred until all code bundles are finished executing or until it is safe to do so (e.g. no pending process needs access to freed named entity). Memory instruction allocate may be executed immediately using CAS. A process can check the shared work area if the allocation of the named entity already took place and use it instead in step 938. This helps in avoiding over-allocating and double-freeing problems. After processing various tasks and the code bundles, various garbage collection techniques can be used to free the system memory when it is safe to do so (to avoid memory leaks, etc.).

The advantages of patchpointing are now discussed. Patchpointing has a number of desirable properties for efficient and scalable concurrent shared resource management. Patchpointing offers a simple, generalized, and easy-to-implement mechanism (e.g. as opposed to various specialized and complicated designs) for lockless concurrent shared resource management. Patchpointing is extendible to any type of workloads (e.g. dynamic or static) and data structures, and scales well. Patchpointing offers great correctness guarantees, in that, patchpointer and its related operations ensure linearizability along with idempotence and freedom from ABA problem.

Patchpointer is memory locality friendly; and does not perform unnecessary memory allocations or data copying; is cache-friendly and virtually makes concurrent writes and reads independent thereby reducing cache-contention; with simple simultaneous word-by-word memory walks, it makes for a predictable pattern, thus bringing high speedups on modern hardware.

Patchpointing avoids all the costs associated with expensive techniques like context saving by storing program state and maintaining counters, etc. to synchronize execution. Patchpointing works for any data structure and can be easily modified to specific data structures based on underlying access patterns.

Patchpointing can be used to achieve an optimal middle-ground between generalizability and performance for any kind of data structure. New processes can be inserted dynamically and patchpointing can handle varying processor loads without any change to its operations. Employed patchpointer data structure is memory locality friendly; and does not perform unnecessary memory allocations or data copying; is cache-friendly and virtually makes concurrent writes and reads independent thereby reducing cache-contention; with simple simultaneous word-by-word memory walks, it makes for a predictable pattern, thus bringing high speedups on modern hardware.

The invention transforms competing processes into collaborating processes and employs patchpointer data structure to improve scalability. The invention utilizes randomized code partitioning and assignment thereby avoiding duplicating of work. The invention uses a simple and practical design to implement and reason about. The invention can handle dynamic workloads with increasing number of processes that are crash-prone and moving at arbitrary speeds. The invention is an optimal middle-ground between generalizability and performance. The invention is flexible and can be modified to suit data structures according to their access patterns. More specifically, the invention has a number of desirable properties for efficient and scalable concurrent shared resource management.

It offers a simple, generalized, and easy-to-implement mechanism (as opposed to various specialized and complicated designs) for lockless concurrent shared resource management. Is easily extendible to any type of workloads (dynamic or static) and data structures, and scales well. It offers great correctness guarantees, in that, patchpointer and its related operations ensure linearizability along with idempotence and freedom from ABA problem.

It avoids all the costs associated with expensive techniques like context saving by storing program state and maintaining counters, etc. to synchronize execution. It works for any data structure and can be easily modified to specific data structures based on underlying access patterns. It achieves an optimal middle-ground between generalizability and performance for any kind of data structure. New processes can be inserted dynamically and patchpointing can handle varying processor loads without any change to its operations.

One additional advantage of the invention is that the collective behavior of the collaborating processes operating on the patchpointer is random. Hence, at any given point of time, a decent sized subset of code bundles is always being executed by processes and even when new code bundles are added at high rates or processes crash in while executing, there is high probability that patchpointing can never be confined to execute only a small subset of the code bundles. By careful choice of the code bundles size, a large subset of code bundles can be executed without much wasted work (due to process crashing or duplication).

In some examples, Patchpointing allows processes to safely (e.g. using fine-grained locking, etc.) help each other in specific ways (e.g. for a specific data structure with specific set of operations and process attributes). Patchpointing avoids expensive CAS operations whenever possible and keeps their use to minimum. Patchpointing doesn't require sharing and maintaining of arbitrary large logs and expensive program states among processes. Patchpointing can be practical, generalizable, scalable and offers great progress guarantees.

Additional Computing Systems

Figure 10:
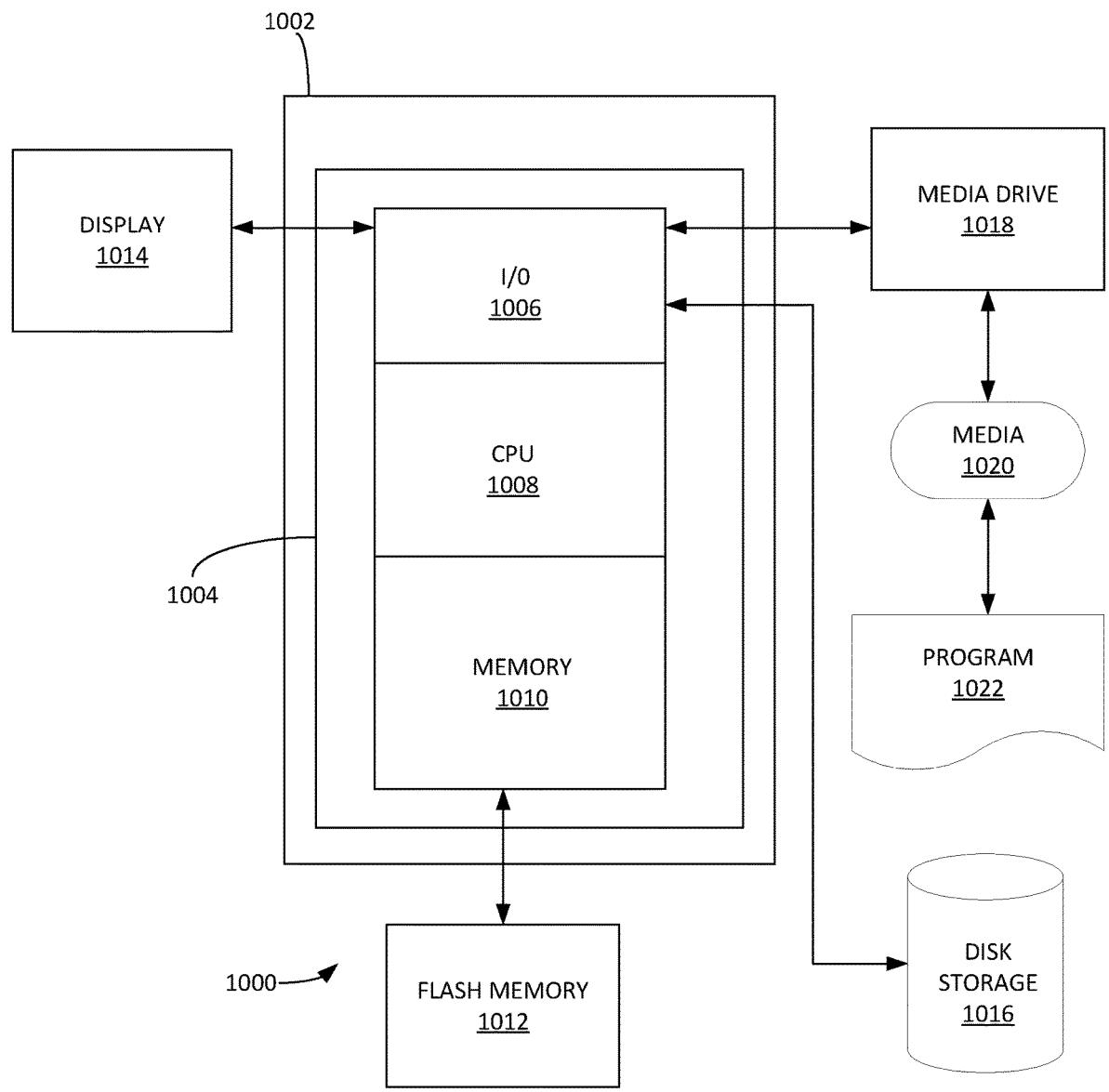
FIG. 10 depicts an exemplary computing system that can be configured to perform any one of the processes provided herein.

FIG. 10 depicts an exemplary computing system 1000 that can be configured to perform any one of the processes provided herein. In this context, computing system 1000 may include, for example, a processor, memory, storage, and I/O devices (e.g., monitor, keyboard, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

FIG. 10 depicts computing system 1000 with a number of components that may be used to perform any of the processes described herein. The main system 1002 includes a motherboard 1004 having an I/O section 1006, one or more central processing units (CPU) 1008 and/or graphical processing unit (GPU), and a memory section 1010, which may have a flash memory card 1012 related to it. The I/O section 1006 can be connected to a display 1014, a keyboard and/or another user input (not shown), a disk storage unit 1016, and a media drive unit 1018. The media drive unit 1018 can read/write a computer-readable medium 1020, which can contain programs 1022 and/or databases. Computing system 1000 can include a web browser. Moreover, it is noted that computing system 1000 can be configured to include additional systems in order to fulfill various functionalities. Computing system 1000 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for scalable, correct, and high-performance asynchronous lockless sharing of a computer resource comprising:
determining there is a contention for a shared computer resource by a plurality of competing processes, wherein the plurality of competing processes are competing to access a same portion of the shared resource;
adding the plurality of competing processes to a priority queue;
retrieving a process at a front of the queue of the plurality of competing processes;
access a work area of the process at a front of the queue;
sharing the work area with other processes of the plurality of competing processes in priority queue;
sanitizing the work area to obtain a plurality of code bundles;
placing the code bundles into a patchpointer; and
processing the patchpointer until the patchpointer is empty.

2. The computerized method of claim 1, wherein a plurality of other data structures is added to the priority queue.

3. The computerized method of claim 2, wherein the plurality of other data structures added to the priority queue comprises at least one of an adaptive radix tree, a chaining hash map, a balanced or unbalanced binary search tree (BST), or a linked list.

4. The computerized method of claim 3, wherein the patchpointer comprises a data structure used for a patchpointing operation.

5. The computerized method of claim 4, wherein the patchpointing operation comprises a method to manage one or more concurrent accesses to the shared computer resource.

6. The computerized method of claim 5, wherein the competing processes simultaneously select processing work uniformly at random.

7. The computerized method of claim 6, wherein an attempt to insert processing works simultaneously at uniformly available random locations in the patchpointer.

8. The computerized method of claim 7, wherein each priority queue is updated continuously, and new processes are added at any time.

9. The computerized method of claim 5, wherein the code bundle comprises a block of code without any function arguments.

10. The computerized method of claim 9, wherein a code bundle is nested inside one another code bundle.

11. The computerized method of claim 5, wherein a function of the plurality of competing processes is transformed into a code bundle by wrapping the function in into a set of code that reads arguments from memory.

12. The computerized method of claim 5, wherein the process with the highest priority is retrieved and the work area of the process with the highest priority is accessed.

13. The computerized method of claim 12, wherein it is determined that the work area of the process with the highest priority is not yet initialized.

14. The computerized method of claim 13, wherein the work area of the process with the highest priority is initialized by a corresponding interpretive processor of the process with the highest priority.

15. The computerized method of claim 14, wherein the work area of the process with the highest priority is made shareable among all the processes in the priority queue.

16. The computerized method of claim 15, wherein the code bundle resides inside the work area.

17. The computerized method of claim 16, wherein the code bundles is split or merged according to preferences.

18. The computerized method of claim 17,
wherein an analysis of program code and an extraction of code bundles comprises a multithreaded computation.

19. The computerized method of claim 18, wherein the code bundle is split or merged according to an access pattern on the underlying shared computer resource.

20. The computerized method of claim 19,
wherein the extracted code bundle is simultaneously placed into the patchpointer and read simultaneously by collaborating processes.

\* \* \* \* \*